United States Patent
Frisendahl

(10) Patent No.: US 7,241,085 B2
(45) Date of Patent: Jul. 10, 2007

(54) DRILLING TOOL FOR HOLEMAKING IN METALLIC WORKPIECES

(75) Inventor: Jörgen Frisendahl, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 288 days.

(21) Appl. No.: 10/437,971

(22) Filed: May 15, 2003

(65) Prior Publication Data

US 2003/0215297 A1 Nov. 20, 2003

(30) Foreign Application Priority Data

May 17, 2002 (SE) .................................. 0201517

(51) Int. Cl.
B23B 51/02 (2006.01)

(52) U.S. Cl. .................. 408/144; 408/230

(58) Field of Classification Search ............... 408/144, 408/227, 230
See application file for complete search history.

(56) References Cited

U.S. PATENT DOCUMENTS

| 4,561,813 | A | * | 12/1985 | Schneider .................. 408/230 |
| 4,583,888 | A | | 4/1986 | Mori et al. |
| 4,983,079 | A | | 1/1991 | Imanaga et al. |
| 5,088,863 | A | | 2/1992 | Imanaga et al. |
| 5,230,593 | A | * | 7/1993 | Imanaga et al. ............ 408/230 |
| 5,273,380 | A | * | 12/1993 | Musacchia ................. 408/230 |
| 5,423,640 | A | * | 6/1995 | Lindblom et al. .......... 408/230 |
| 5,442,979 | A | * | 8/1995 | Hsu ........................ 76/108.6 |
| 5,716,172 | A | * | 2/1998 | Nakamura et al. .......... 408/230 |
| 5,807,041 | A | * | 9/1998 | Lindblom ................... 408/230 |
| 5,846,035 | A | * | 12/1998 | Karafillis et al. .......... 408/1 R |
| 6,071,046 | A | | 6/2000 | Hecht et al. |
| 6,132,149 | A | | 10/2000 | Howarth et al. |
| 6,309,149 | B1 | | 10/2001 | Borschert et al. |
| 6,443,674 | B1 | * | 9/2002 | Jaconi ...................... 408/1 R |
| 6,585,460 | B1 | * | 7/2003 | Meece et al. ............... 408/230 |
| 6,655,882 | B2 | * | 12/2003 | Heinrich et al. ............ 408/144 |
| 6,857,832 | B2 | * | 2/2005 | Nygård ..................... 408/211 |
| 2002/0044843 | A1 | * | 4/2002 | Suzuki et al. .............. 408/144 |
| 2003/0039522 | A1 | * | 2/2003 | Yanagida et al. ........... 408/230 |
| 2003/0053873 | A1 | * | 3/2003 | Shaffer ..................... 408/230 |
| 2003/0129031 | A1 | * | 7/2003 | Mast et al. ................ 408/144 |

FOREIGN PATENT DOCUMENTS

| DE | 100 27 544 A1 | 12/2001 |
| EP | 0 320 881 A2 | 6/1989 |
| EP | 0 589 858 A1 | 4/1994 |

* cited by examiner

Primary Examiner—Monica Carter
Assistant Examiner—Michael W. Talbot
(74) Attorney, Agent, or Firm—Drinker Biddle & Reath LLP

(57) ABSTRACT

A drill comprises a shaft with chip conveying flutes and a drill head at its forward end with at least two cutting inserts. Each cutting insert is provided with at least one cutting edge which is delimited between a chipbreaking surface and first relief surface and which includes an outer straight edge. In the proximity of the center axis of the shaft, a curved cutting edge section is provided, to which there is connected an adjacent enforcement bevel. The cutting edge is in direct proximity to a center axis, and is terminated by a chisel edge between the cutting inserts to serve as a centering core portion. The curved cutting edge section is inwardly followed by a primary straight portion without an adjacent enforcement bevel in a direction that is oriented at an angle of between approximately 40–50° in relation to a horizontal line that extends through the center axis of the drill.

18 Claims, 4 Drawing Sheets

DRILLING TOOL FOR HOLEMAKING IN METALLIC WORKPIECES

This application claims priority under 35 U.S.C. §119 to Patent Application Serial No. 0201517-0 filed in Sweden on May 17, 2002, the entire content of which is hereby incorporated by reference.

FIELD OF THE INVENTION

The present invention relates to a drill for machining of metal workpieces. More particularly, the present invention relates to a drill for machining of metal workpieces comprising a shaft with chip conveying flutes and an integral drill head at the front of the shaft, with two or more cutting inserts, each of which comprise at least one cutting edge and a relief surface and which at least in the vicinity of the geometric center or rotation axis of the drill comprises a curved section.

BACKGROUND OF THE INVENTION

Drills of the above-noted type are previously known from U.S. Pat. No. 4,983,079 and U.S. Pat. No. 5,088,863. With these prior art drills, however, clearance surfaces at the edges extend in an unbroken manner from the peripheral end of the edge until its curved portion adjacent the core centering portion. This means that the drill head obtains a tip angle only in one main plane that is parallel with the straight edge portion but not in a plane that extends laterally from the main plane. Despite providing a core centering portion, such drills can perform with only a marginal improvement of its centering ability compared with conventional drills which are not provided with such centering core portions. An essentially similar drill is disclosed in U.S. Pat. No. 4,583,888.

SUMMARY OF THE INVENTION

One object of the invention is to eliminate the above mentioned problems of previously known drills and create a drill with improved centering ability. Thus, a primary object of the present invention is to confer to the head of the drill such a geometry that it becomes self-centering at the placing against and the initial penetration of the drill into a workpiece. The drill shall also maintain a good centering ability during the continuing penetration of the workpiece whereby the good centering ability shall be possible to achieve without the necessity of large feeding or placing forces.

Another object of the present invention is to attain a good centering ability without the necessity of substantially reducing the active cutting edge length. It is another object of the invention to achieve a drill which enables an increased feed and larger drilling speed. Yet another object of the invention is to provide a drill with improved chip evacuating ability during machining and simultaneously attain more stable drilling and improved tightness of tolerances. It is another object of the invention to provide a drill having such geometry in the proximity of the drill center that regrinding of the cutting edge portions can occur in a better way than heretofor.

According to one aspect of the invention, a drill includes a shaft having a center axis. Chip conveying flutes are formed in the shaft. A drill head with at least two cutting inserts is provided, each of the cutting inserts being provided with at least one cutting edge. The at least one cutting edge is delimited between a chip-breaking surface and a first relief surface. The at least one cutting edge includes an outer straight edge section, a curved cutting edge section in the proximity of the center axis of the shaft, and an adjacent enforcement bevel. The at least one cutting edge is in direct proximity of the center axis and is terminated by a chisel edge between said the cutting inserts in order to serve as centering means during drilling. The curved cutting edge section is inwardly followed by a primary straight portion without an adjacent enforcement bevel in a direction that is oriented at an angle of between approximately 40–50° in relation to a horizontal line that extends through the center axis of the drill.

BRIEF DESCRIPTION OF THE DRAWINGS

Further features and characteristics of the present invention will become more apparent from the following detailed description considered with reference to the accompanying drawing figures.

DETAILED DESCRIPTION OF THE PREFERRED EMBODIMENTS

Figure 1:
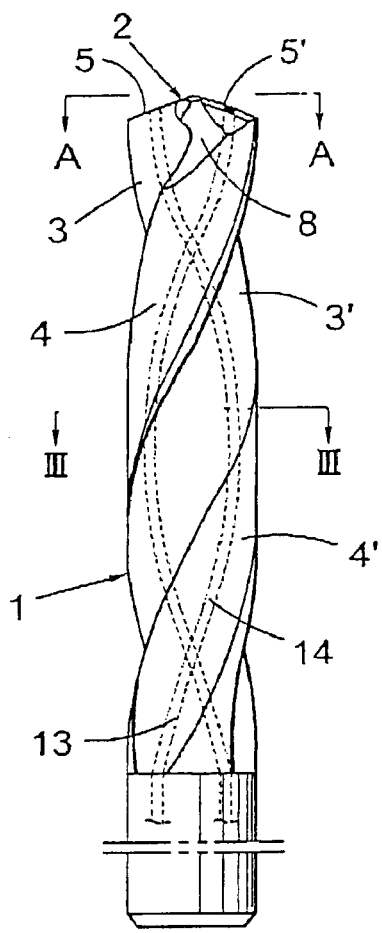
FIG. 1 shows a side view of a drill according to the invention.
Figure 2:
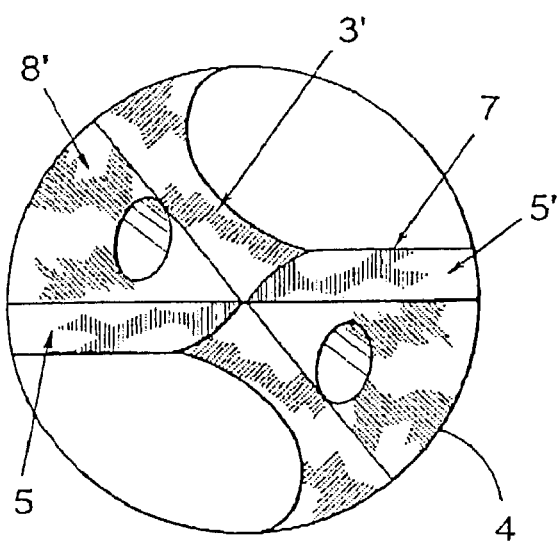
FIG. 2 shows an end view of the head of the drill according to FIG. 1.
Figure 4:
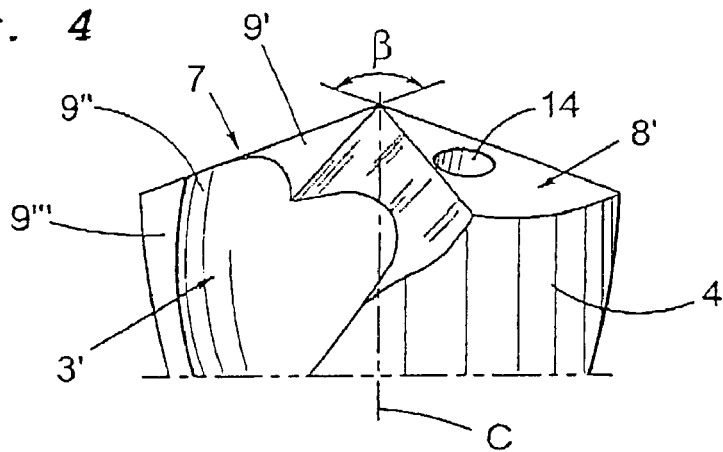
FIG. 4 shows an amplification of same drill as shown in FIGS. 1–3.
Figure 5:
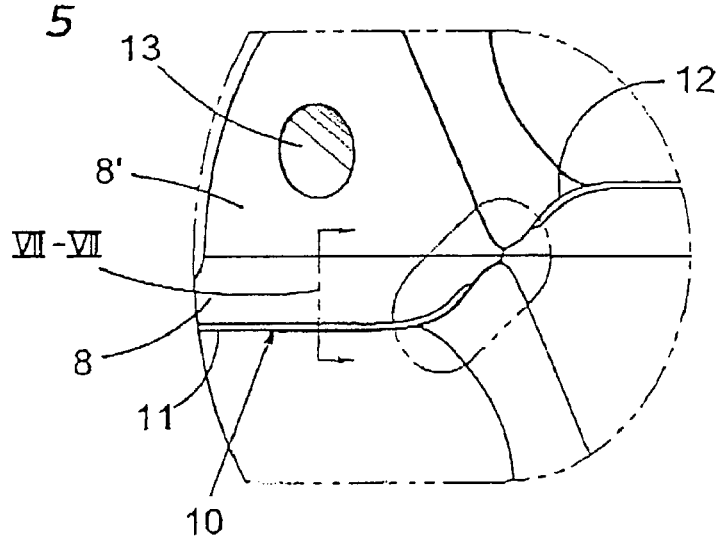
FIG. 5 shows an amplification of the central tip section of the drill head, seen as an end view.

The drill shown in FIGS. 1 and 2 comprises a shaft 1 and a drill head designated in its entirety by 2. Two helical or screw-formed flutes 3,3' are formed in the shaft 1, which flutes are delimited by analogous, helically formed protruding lands 4,4'. The drill head 2 comprises two, in the present case identical, but inverted cutting elements 5,5' which extend in each other's extension in a common main plane A—A that cuts the center or rotation axis of the drill (in FIG. 4, this axis is designated by C). In this embodiment, the cutting elements 5,5' are made as parts of a common cutting body, e.g. of cemented carbide, which is an integrated portion of the shaft made in same material and thereafter ground to its final shape, as shown in the drawings. This final shaping of the drilling tool can occur by grinding, injection molding, or by other means.

Each individual cutting element 5,5' comprises a cutting edge designated in its entirety by 7, which is generally delimited between, on the one hand, a primary clearance surface 8 and a secondary clearance surface 8' provided at an obtuse angle therefrom, and on the other hand, a relief surface 9 while there is a bevel phase 10, provided therebetween.

The clearance surface 8 is provided with a clearance angle $\alpha_1$ from a horizontal plane H through the cutting edge whereas the clearance surface 8' is provided at another clearance angle $\alpha_2$ from said plane H. The radially inner portion 9' of this chip surface is convexly curved and has an approximately zero degree axial inclination and its portion close to the center whereas the radially outer portion 9" has a concave shape which radially outwardly extends into a planar portion 9'". In the curved transition zone between the outer end portion of surface portion 9" and the planar end portion 9'", the final chipbreaking will occur before the chip becomes removed rearwardly during machining.

The individual cutting edge 7 includes a first essentially straight main portion 11 that extends inwardly from the periphery of the drill head and which extends into a curved portion 12 closer to the drill center. The drill is provided with means for internal cooling in the shape of two helical cooling channels 13 and 14 that extend through the drill. With the drill seen in a sideview the main cutting edges include between them an angle β that amounts to 116–152 degrees, preferably 138–142 degrees.

Next after the curved portion 12, the edge extends into a short straight portion 12' that radially inwardly intersects with a ground portion 12", which in this embodiment intersects with a so called chisel edge 15 at an obtuse angle, whereby the chisel edge extends through the drill center. This portion 12" could alternatively be concavely curved. It is a distinguishing feature that the straight line which defines the direction of the portion 12' does not extend through the drill center but does instead extend in a direction located a distance below the drill center suitably at a distance about 0.05 mm below the drill center. This enables obtaining better possibilities for chip evacuation and at the same time improved possibilities for regrinding in the drill center. The portion 12' should extend in a direction that is oriented at an angle of $\alpha_3$ that amounts to 40–50 degrees, preferably 42–48 degrees in relation to a horizontal line $L_1$ that extends through the drill center. It is a further distinguishing feature that there is provided a ground bevel phase 10 extending along both the curved portion 12 and the entire straight edge portion 11, whereby said bevel phase is provided as a transition to the length of the clearance surface 8. The extension of this edge reinforcing bevel 10 ends when the curved portion 12 meets with the straight edge portion 12' towards the drill center. This mentioned bevel phase 10 should have a width b that amounts to a value of 0.04–0.16 mm within a diameter range 3–20 mm. Further, the chip angle γ of said bevel phase 10 should amount to 25–35 degrees. This improves the possibility of using a more efficient drill feed at the same time as the lifetime of the drill is extended.

Figure 6:
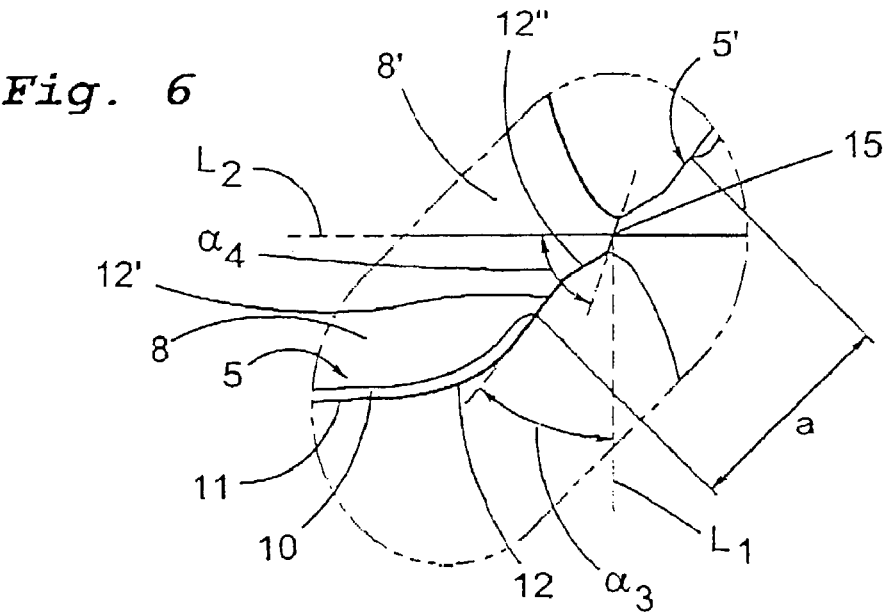
FIG. 6 shows an extreme amplification of the tip of the drill head.
Figure 7:
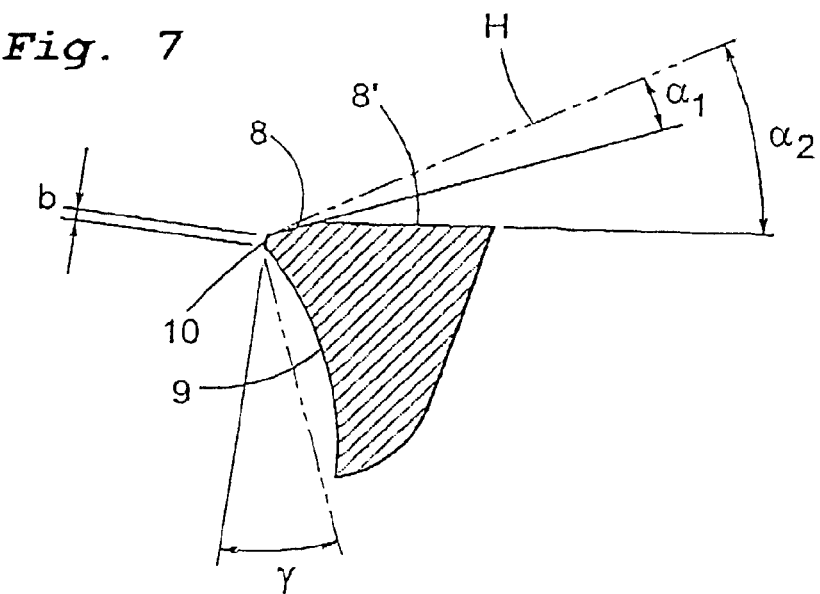
FIG. 7 shows a partial cross-section along line VII—VII in FIG. 5.

A further important dimensioning rule is to choose the distance "a" in FIG. 6 such that the tip geometry is better optimized so as to improve the centering ability of the drill, whereby said distance "a" defines the linear radial distance between the intersecting points for the cutting edge portions 12 and 12' respectively, whereby said distance "a" should amount to a value in the range of 17–21% of the drill diameter which is designated D. When it comes to dimensioning rules in other aspects it has been found being of advantage to make sure that the clearance angle $\alpha_1$ for the primary clearance surface 8 amounts to a value in the range 4–9 degrees for drills in the diameter range 3–20 mm where the lower angular values are valid for the upper portion of the diameter range. The angle $\alpha_1$ should for instance be about 4 degrees for drills having a diameter in the range 16–20 mm whereas corresponding angle $\alpha_1$ should amount to about 9 degrees in the diameter range 3–5 mm. As regards the size of the $\alpha_2$ angle for the secondary clearance surface 8', there should be a varying value in the angular range 20–27 degrees wherein the large angular values should be applicable for the smaller diameter range.

Figure 3:
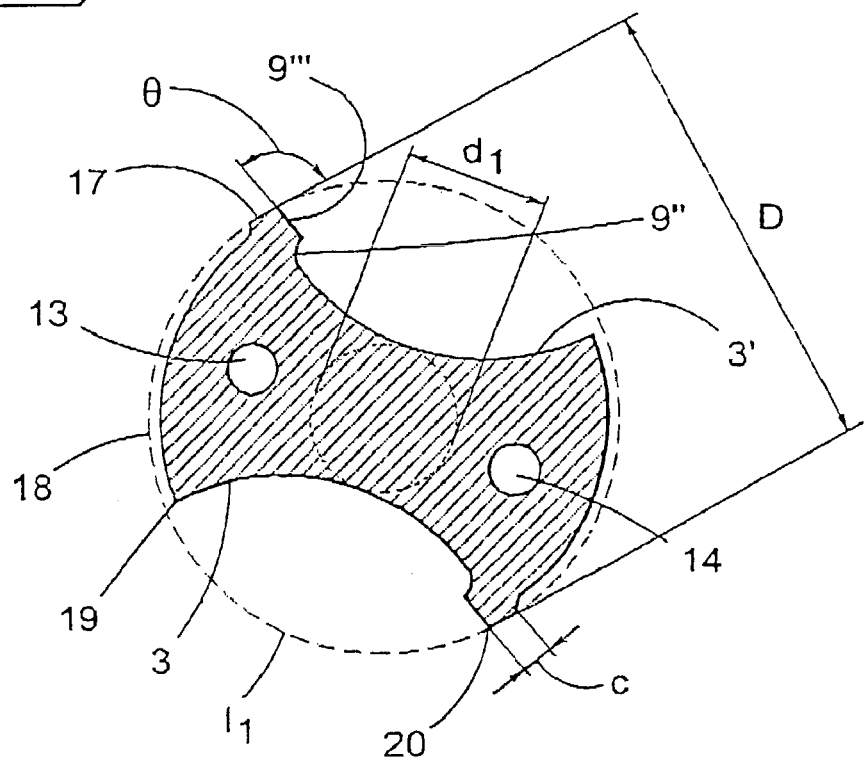
FIG. 3 shows cross-section along line III—III of the drill in FIG. 1.

Further, as regards the size of the core area of the drill, taken at a cross-section along the line III—III in FIG. 1, this should amount to 48–54% of the entire area of the circle extending all around whereby it is referred in this connection to FIG. 3 where $d_1$, designates the core diameter. As further appears from FIG. 3, the mantle surface 18, at the transition to the recesses 3 and 3', is provided with a rib 17 which is located on a mantle surface of somewhat larger diameter than the peripheral surface located next thereto. The width c of the rib 17 which extends in a helical fashion in longitudinal direction ought to be 0.20–0.90 mm for a drill diameter range 3–20 mm. As regards the width of the chisel edge 15 it has been found suitable to choose a value that amounts to 0.010–0.020, preferably 0.016 times the drill diameter to achieve the best results. It is to be noticed that the size of the angle $\alpha_4$, between the direction of the chisel edge and a horizontal line L2 through the center should amount to 44–67.5 degrees, preferably 50–55 degrees where 44 degrees correspond with a tip angle β of 150 degrees and 67.5 degrees which corresponds with a tip angle of 118 degrees.

In order to furthermore improve the performance of the drill and increase its lifetime, it has been found being of advantage to provide at least the front portion of the drill which an outer layer of TiAlN to be provided by physical vapor deposition technique normally referred to as a PVD-coating. The TiAlN-coating taken in combination with the selected tip geometry makes t capable of penetrating through most workpiece materials with lower cutting force than for the standard drill variants which demands lower effect, increases the lifetime of the tool and at the same time promotes the cutting ability and makes the drill hole to be more precise.

Figure 8:
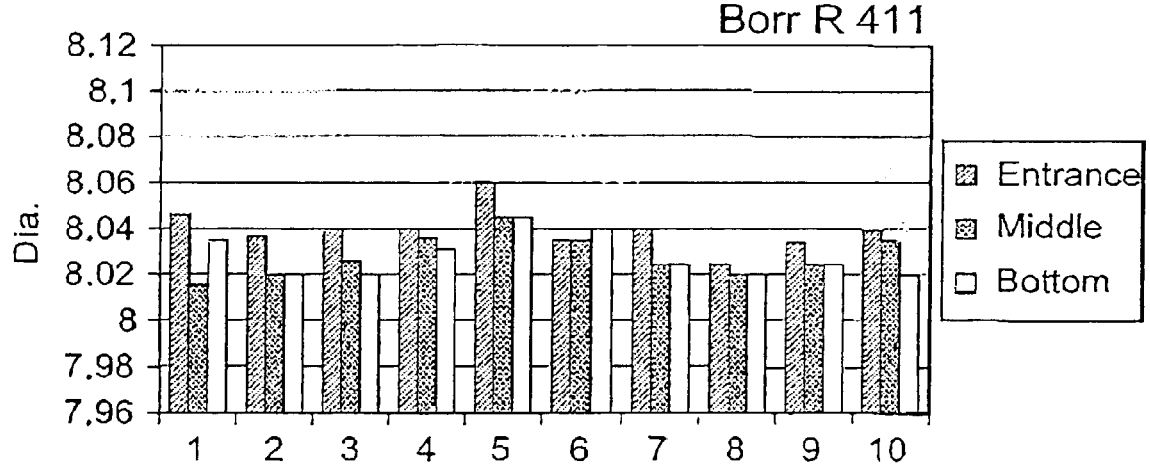
FIG. 8 shows surface roughness measurement results taken from drilled holes using a drill as disclosed in U.S. Pat. No. 4,583,888.
Figure 9:
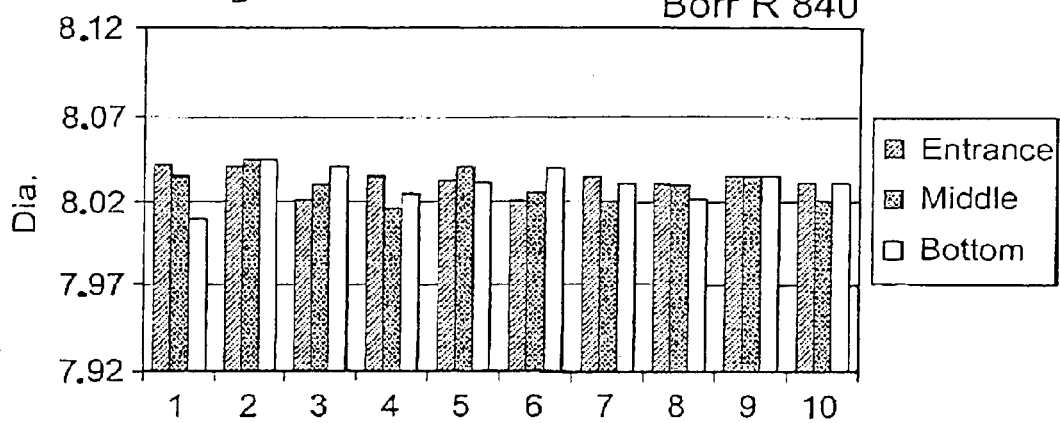
FIG. 9 shows corresponding surface measurement results taken from drilled holes using a drill for the present invention.
Figure 10:
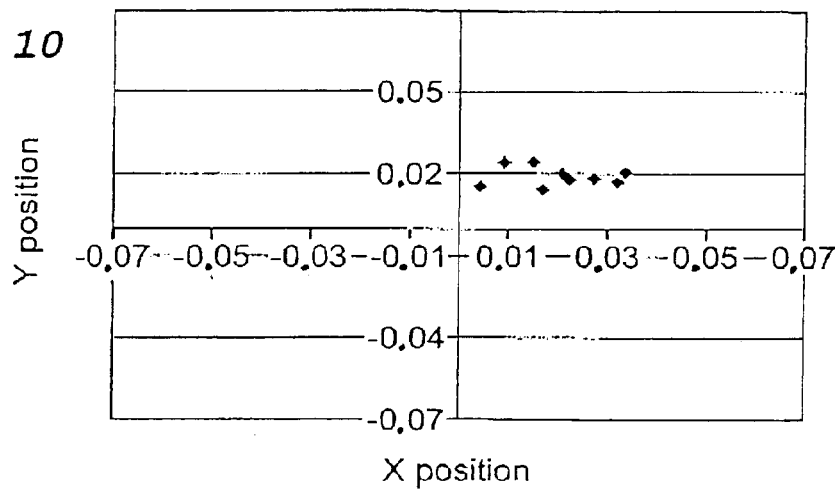
FIGS. 10–11 show the positioning of measured values in x- and y-directions from measurements made on drills according to FIGS. 8–9.
Figure 11:
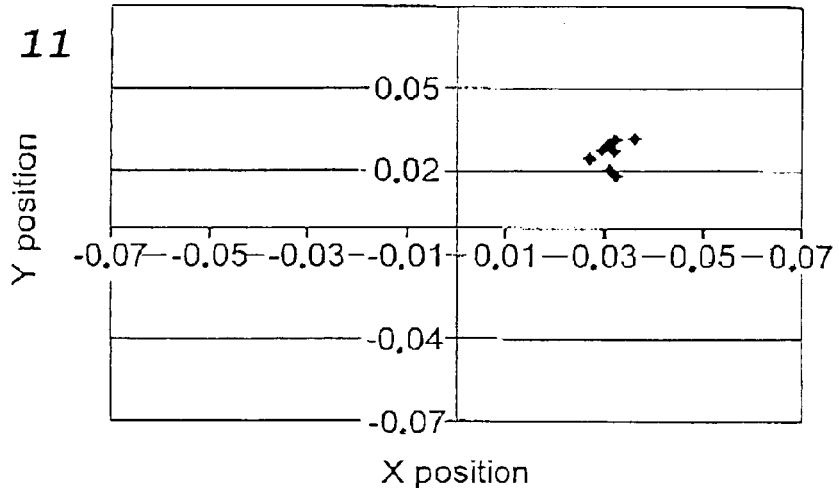

As regards the evenness of the surface of the completed hole, it is important that the sharpness is good and that the drill geometry is such as to avoid letting the chip come into contact with the hole wall of the drill hole in an incorrect manner. It has been found that with the present drill there is obtained a chip with a desirable curvature within the recess 3 and 3' and thereafter it is evacuated from the recess as it is broken. An active contribution to this chip formation is obtained thanks to the concave surface 9" radially outwards which provides an obtuse-angled intersection with the outer planar ground surface 9'" as best appears from FIG. 3. This planar surface 9'" is then intersecting with the outer rib 17 to form a perpendicular intersection designated θ. The data for the evenness of the finally obtained surface is illustrated in FIG. 8 and FIG. 9. In FIG. 8, there is shown the results from hole penetration with a drill having the appearance according to what is shown in patent specification U.S. Pat. No. 4,583,888 whereas the results given in FIG. 9 correspond with the drill embodiments in accordance with the present invention. In each of these figures, the horizontal axis represent data from ten (10) holes of the material to be drilled and the vertical axis represent the diameter of the hole that has been drilled. For each three staples are shown where the staple to the left represents the value at the entrance of the hole, the middle staple represents the measurement at the middle of the hole and the value to the right represents the value measure at the exit of the hole. As appears from the figures, the evenness of the hole is obtained with the drill according to the invention such that the finally obtained surface is almost free from defects. The comparison drill designated R411, the results of which appear in FIG. 8, has drill geometry corresponding with the drill shown and described in U.S. Pat. No. 4,583,888. It is clear from what is shown in FIG. 10 and FIG. 11 that the finally obtained surface has an evenness that is much more free from defects than what is the case with the drill R411. This becomes clear when studying the spreading of the measurement results since the spreading is much more clear than with the drill according to the present invention. The positions primarily in the x-direction is clearly much more spread out for the drill designated R411. The given values in x- and y-directions are given in mm. As appears therefrom the spreading is about three hundred in x-direction and for the prior art drill and only about one hundred for the new drill. It is of central importance for obtaining desirable short chips, that are easy to evacuate from the central drill zone, that the clearance surface adjacent the drill tip has a desirable shape. It has been found desirable that the axial inclination angle is essential equal to zero which, in combination with the convexly curved edge 12 close to the center results in short comma-shaped chips that can be easily evacuated rearwardly through the chip evacuation recess 3 and 3'.

It is of importance for the total optimization of the drill that the chip evacuation recesses end towards the peripheral surface 18 on the drill. In FIG. 3, it is shown how the two recesses 3 and 3' symmetrically come to their exit and intersect with the peripheral surface at the points 19 and 20. The information ought to be such that the length 1, of the circumscribed circle between the points 19 and 20 amount to 25–31% of the total length of the circumscribed circle.

In order to explain the performance of the drill in comparison with the prior art drill according to U.S. Pat. No. 4,583,888, the penetration depth and the drilling speed have been measured during machining in three representative workpiece materials including conventional carbon steel, ferritic stainless steel and cast iron whereby a cutting fluid soluble in water has been used during machining.

TABLE 1

| Material | Hardness HB | Cutting speed m/min | Drill diam. mm | Feed mm/rev | Increased feed/rev compared with drill R411 (%) |
|---|---|---|---|---|---|
| Carbon steel | 150 | 80–140 | 6–10 | 0.15–0.30 | 36 |
| Stainless | 200 | 40–80 | 6–10 | 0.08–0.20 | 42 |
| Cast iron | 230 | 70–130 | 6–10 | 0.20–0.35 | 16 |

In Table 1 above, there has been given values to show which kind of performance that has been achieved during drilling with a drill R840 according to the present invention as shown in comparison with the drilling results obtained with a drill of type R411 that correspond with U.S. Pat. No. 4,583,888. As is clear therefore a substantial improvement of results has been obtained.

In accordance with an alternative embodiment of the invention the drill can be made in two parts, namely a front part carrying cutting inserts that is made partly or wholly of cemented carbide whereas the rear portion could be made of a material softer than cemented carbide such as tool steel. The forwardly located portion of the drill could be connected to the rear drill shaft by a mechanical coupling or a torque resistant coupling.

The principles, preferred embodiments and manner of use of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A drill, comprising:
 a shaft having a center axis;
 chip conveying flutes formed in the shaft;
 a drill head with at least two cutting inserts, each said cutting inserts being provided with at least one cutting edge, said at least one cutting edge being delimited between a chip-breaking surface and a first relief surface, said at least one cutting edge including an outer straight edge section, a curved cutting edge section in the proximity of the center axis of the shaft, and an adjacent enforcement bevel;
 said at least one cutting edge in direct proximity of said center axis and being terminated by a chisel edge between said cutting inserts in order to serve as centering means during drilling, wherein the curved cutting edge section is inwardly followed by a primary straight portion without an adjacent enforcement bevel in a direction that is oriented at an angle of between approximately 40–50° in relation to a horizontal line that extends through the center axis of the drill,
 wherein a radial linear distance between the intersection points between radially outer end points of the primary straight portions on either side of the center axis is approximately 0.17 to 0.21 times a diameter of the drill.

2. The drill according to claim 1, wherein the chisel edge in the center has a length that is between approximately 0.010–0.020 times a diameter of the drill.

3. The drill according to claim 1, wherein an angle between a direction of the chisel edge and a horizontal line through the drill center is between approximately 44–67.5°.

4. The drill according to claim 1, wherein the primary straight portion is disposed adjacent to the curved section in a direction inwardly followed by a secondary straight portion that is oriented at an obtuse angle from the primary straight portion.

5. The drill according to claim 4, wherein a chip angle along a convexly curved section and along the inwardly therefrom located straight edge portions are approximately zero degrees.

6. The drill according to claim 4, wherein a clearance angle for a secondary clearance surface is approximately between 20–27° .

7. The drill according to claim 1, wherein a clearance angle for the first relief along the at least one cutting edge is approximately between 4–9° for drills having a diameter of between approximately 3–20 mm.

8. The drill according to claim 1, wherein a size of a core area of the drill taken along a cross-section a distance axially behind the forward drill head is between approximately 48–52% of the entire area of a circumscribed circle of the drill.

9. The drill according to claim 8, wherein a length of the circumscribed circle between points where the chip conveying flutes intersect with a peripheral surface of the drill is between approximately 25–31% of the total length of the circumscribed circle of the drill.

10. The drill according to claim 1, wherein a rib is provided adjacent each chip conveying flute, the width of is between approximately 0.20–0.90 mm for drills having a diameter between approximately 3–20 mm.

11. The drill according to claim 1, wherein a planarly ground enforcement bevel is provided along the straight edge portion and along the curved edge portion, the width of which is between approximately 0.04–0.16 mm within a drill diameter range of between approximately 3–20 mm.

12. The drill according to claim 1, wherein the inserts are provided at an angle of between approximately 138–142°.

13. The drill according to any of the claim 1, wherein radially outer portions of the flutes are each provided as an essentially planarly ground surface which is oriented at an obtuse angle from a radially inner concave curved portion.

14. The drill according to claim 1, wherein at least the forward portion of the drill is provided with a layer of TiAlN.

15. The drill according to claim 1, wherein the cutting inserts are made of cemented carbide and are provided as an integral portion of the drill shaft which is made of the same material.

16. The drill according to claim 1, wherein a forward portion of the drill is made entirely or partially of cemented carbide, and that said forward portion of the drill is connected with a rear shaft portion by a mechanical or torque resistant connection, said rear shaft portion being made of a material that is softer in relation to cemented carbide.

17. The drill according to claim 1, wherein the angle between the primary straight portion and the horizontal line that extends through the center axis is between approximately 42–48°.

18. The drill according to claim 1, wherein the angle between the direction of the chisel edge and a horizontal line through the drill center is between approximately 50–55°.

* * * * *